United States Patent
Olivier et al.

(10) Patent No.: US 6,512,802 B1
(45) Date of Patent: Jan. 28, 2003

(54) METHOD AND APPARATUS FOR EQUALIZATION AND DATA SYMBOL DETECTION FOR MPSK MODULATION

(75) Inventors: Jan C. Olivier, Highland Village, TX (US); Chengshan Xiao, Nepean (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/407,248

(22) Filed: Sep. 28, 1999

(51) Int. Cl.[7] ............................ H04L 27/22; H04L 27/01
(52) U.S. Cl. ...................... 375/329; 375/340; 375/348; 375/350
(58) Field of Search ................ 375/231, 329, 375/333, 340, 341, 350, 348

(56) References Cited

U.S. PATENT DOCUMENTS

| 5,867,538 A | 2/1999 | Liu ............................ 375/341 |
| 5,887,035 A * | 3/1999 | Molnar ....................... 375/340 |
| 5,912,931 A | 6/1999 | Matsumato et al. ........ 375/340 |
| 6,049,574 A * | 4/2000 | Noonan et al. ............. 375/231 |
| 6,345,076 B1 * | 2/2002 | Petersen et al. ............ 375/229 |

* cited by examiner

*Primary Examiner*—Amanda T. Le
(74) *Attorney, Agent, or Firm*—Pearne & Gordon LLP

(57) ABSTRACT

A method and an apparatus for detecting data symbols of a multiple-phase-shift-keying (MPSK) modulated slot used for radio reception of digital data are disclosed. The method and apparatus simultaneously accomplish signal equalization and symbol detection. A simplified algorithm is used which is sub-optimal but closely approximates an optimal solution which significantly reduces computational load. A solution vector is constructed and data symbol values in the solution vector are perturbated. After each perturbation, a solution error is computed to determine whether the perturbated value provides a better solution. Perturbation continues until an optimal solution is found or a maximum number of iterations have been performed. The advantage is an improved, cost-effective radio receiver which enables faster wireless data transfer.

34 Claims, 5 Drawing Sheets

$$\underbrace{\begin{bmatrix} s_0 \\ s_1 \\ s_2 \\ s_3 \\ s_4 \\ s_5 \\ s_6 \\ s_7 \\ s_8 \\ \vdots \\ s_{56} \\ s_{57} \end{bmatrix}}_{S} = \underbrace{\begin{bmatrix} r_0 & 0 & 0 & 0 & 0 & 0 & 0 & 0 & 0 & \cdots & 0 & 0 \\ r_1 & r_0 & 0 & 0 & 0 & 0 & 0 & 0 & 0 & \cdots & 0 & 0 \\ r_2 & r_1 & r_0 & 0 & 0 & 0 & 0 & 0 & 0 & \cdots & 0 & 0 \\ r_3 & r_2 & r_1 & r_0 & 0 & 0 & 0 & 0 & 0 & \cdots & 0 & 0 \\ r_4 & r_3 & r_2 & r_1 & r_0 & 0 & 0 & 0 & 0 & \cdots & 0 & 0 \\ r_5 & r_4 & r_3 & r_2 & r_1 & r_0 & 0 & 0 & 0 & \cdots & 0 & 0 \\ r_6 & r_5 & r_4 & r_3 & r_2 & r_1 & r_0 & 0 & 0 & \cdots & 0 & 0 \\ 0 & r_6 & r_5 & r_4 & r_3 & r_2 & r_1 & r_0 & 0 & \cdots & 0 & 0 \\ 0 & 0 & r_6 & r_5 & r_4 & r_3 & r_2 & r_1 & r_0 & \cdots & 0 & 0 \\ \vdots & \vdots & \vdots & \vdots & \vdots & \vdots & \vdots & \vdots & \vdots & \cdots & \vdots & \vdots \\ 0 & 0 & \cdots & 0 & r_6 & r_5 & r_4 & r_3 & r_2 & r_1 & r_0 & 0 \\ 0 & 0 & \cdots & 0 & 0 & r_6 & r_5 & r_4 & r_3 & r_2 & r_1 & r_0 \end{bmatrix}}_{A} \underbrace{\begin{bmatrix} d_0 \\ d_1 \\ d_2 \\ d_3 \\ d_4 \\ d_5 \\ d_6 \\ d_7 \\ d_8 \\ \vdots \\ d_{56} \\ d_{57} \end{bmatrix}}_{D}$$

FIG. 5

METHOD AND APPARATUS FOR EQUALIZATION AND DATA SYMBOL DETECTION FOR MPSK MODULATION

TECHNICAL FIELD

This invention relates generally to the reception and decoding of digitally modulated radio signals and, in particular, to a detection and decoding algorithm which provides a sub-optimal solution for an equalizer and symbol detector that approximates the performance of an optimal equalizer and an optional symbol detector but considerably reduces computational load.

BACKGROUND OF THE INVENTION

There has been an exponential increase in demand for wireless communication devices which was initiated by the development of cellular telephones. Recently, many applications have been developed which use wireless devices for transmitting digital data. Those applications include communications services such as electronic mail and text paging, wireless World Wide Web access, wireless file transfer, etc. The use of digitally modulated radio signals for data transfer has generated a demand for faster transfer rates. An accepted method of increasing digitally modulated radio signal transfer rates is to use multiple-phase-shift-keying (MPSK) as the modulation scheme. With MPSK, complexity becomes an important issue in the development of a receiver. As is well understood, as the number of points in an MPSK constellation increases, there is a corresponding increase in the sensitivity to additive white gaussian noise (AWGN) which cannot be avoided.

Digitally modulated radio signals also are subject to degraded signal quality as a result of multipath fading caused by environmental factors such as terrestrial terrain, co-channel interference and noise corruption. Multipath fading and Doppler effects caused by mobile channels causes intersymbol interference (ISI) which can have very undesirable results on performance during data transfer. In extreme cases, a bit-error rate (BER) can reach levels that are outside the limitations specified for acceptable or useful communications.

An equalizer structure is required to compensate for the ISI caused by dispersion resulting from multipath fading and Doppler effects. As is well understood in the art, there is a window associated with equalization. The length of the window determines how well an equalizer works. The longer the window, the greater the number of ISI terms that the equalizer is able to compensate. However, the longer the window, the greater the complexity of the processing required. In general, the number of states that must be considered for an ISI term is $M^L$ where M is the number of points in an MPSK constellation and L is the length of the equalization window. Consequently, computational load rapidly increases as points are added to an MPSK constellation.

It is well known in the art that an optimal equalizer can be constructed using a maximum-likelihood sequence-estimation (MLSE) structure utilizing the well known Viterbi algorithm. However, the complexity of the Viterbi algorithm grows exponentially with the number of states required in processing. The exponential increase in the number of states required in processing makes the MLSE structure impossible to implement at reasonable cost in a real radio receiver using known technology.

Alternatives to the MLSE structure have been developed. One alternative known as the minimum-mean-squared-error (MMSE) structure, such as a decision-feedback equalizer (DFE), is known to be simpler to implement. However, its performance can be quite poor for high density MPSK constellations, and consequently it has proven to be unacceptable for mobile radio data communications applications which use high density MPSK.

In order to provide a near optimal equalizer which can be implemented in radio receivers, a sub-optimal structure that provides performance superior to the MMSE structure and yet significantly reduces the computational load of the equalization process has been invented. This structure is described in co-pending PCT Application Serial No. PCT/FR99/00661, which designates the United States and is entitled A METHOD OF NUMERICAL EQUALIZATION AND WIRELESS RECEPTION EMPLOYING SUCH A METHOD which was filed on Mar. 25, 1998 by Applicants' subsidiary Nortel Matra Cellular. This equalizer structure provides a sub-optimal solution which approximates the performance of the MLSE structure while considerably reducing computational intensity.

However, as the demand for faster and more efficient wireless data communications increases, there is a need for a radio signal equalizer capable of better performance while requiring less computational intensity, so that the reliability of data transfer is improved while the cost of radio transceivers is reduced.

Furthermore, prior art radio frequency receiver models segregate equalization from symbol detection. Equalization is performed first and then symbol detection is performed. This limits the computational time available for both equalization and symbol detection. There therefore exists a need for an algorithm that enables simultaneous equalization and symbol detection for MPSK digitally modulated radio signals.

SUMMARY OF THE INVENTION

It is therefore an object of the invention to provide a radio signal equalizer and an MPSK symbol detector capable of improved performance while requiring fewer computations than MPSK symbol detectors known in the prior art.

Accordingly, an aspect of the present invention provides a method of detecting data symbols of an MPSK modulated slot received by a radio receiver. The method includes a first step of preparing an initial solution vector, including an estimated value for each data symbol. A solution error of the solution vector is then calculated, and the solution error is minimized by perturbating the solution vector.

A further aspect of the invention provides an equalizer and data symbol detector for MPSK modulated slots received by a radio receiver. The equalizer and data symbol detector comprises a processor adapted to prepare an initial solution vector including an estimated value for each data symbol. The processor subsequently calculates a solution error for the solution vector, and minimizes the solution error by perturbating individual data values of the solution vector in a systematic way.

A still further aspect of the present invention provides a radio communications device adapted for radio communication of data symbols of an MPSK modulated slot. A receiver is adapted to receive a radio signal containing the MPSK modulated slot. A sampler is adapted to sample the received radio signal to generate a sample vector of the received slot. Finally, a processor is adapted to compute an initial solution vector including an estimated value for each data symbol. The processor then calculates a solution error for the solution vector, and minimizes the solution error by perturbating individual data values of the solution vector in a systematic way.

In accordance with the invention, the initial solution vector is prepared by estimating a value for each data symbol of the solution vector by single-symbol detection.

In an embodiment of the invention the steps of calculating a solution error and minimizing the solution error are repeated recursively until a predetermined terminating condition is satisfied. The predetermined terminating conditions may include the solution error being less than a predetermined threshold value, a change in the solution error between successive iterations less than a predetermined threshold value, or a number of iterations performed equals a predetermined number.

In an embodiment of the invention, perturbation of the solution vector comprises successively perturbating the value of only one symbol of the solution vector and computing a solution error after each perturbation. Preferably, perturbating the value of each symbol of the solution vector is done by substituting an initial value $d[n]_0$ of the symbol with a first neighboring value from an MPSK constellation $d[n]_{0+1}$. A solution error $\epsilon_{0+1}$ for the solution vector modified by the substitution of the first neighboring value is then computed. The initial value $d[n]_0$ of the symbol is then substituted with an opposite neighboring value from the MPSK constellation $d[n]_{0-1}$. A respective second solution error $\epsilon_{0-1}$, for the solution vector including the second neighboring value is computed. The three solution errors, $\epsilon_0$, $\epsilon_{0+1}$ and $\epsilon_{0-1}$, are then compared and the smallest solution error is selected. If the smallest solution error is not $\epsilon_0$, the neighboring value corresponding to the smallest solution error is adopted as the value of d[n].

Preferably, the value of only one symbol is perturbated during each perturbation step.

Preferably, the value of each symbol of the solution vector is perturbated in an order opposite to an order of estimation of values of the initial solution vector.

BRIEF DESCRIPTION OF THE DRAWINGS

FIG. 5 illustrates a relationship between a data symbol sample vector, a channel impulse response matrix and a solution vector in accordance with the present invention.

DETAILED DESCRIPTION OF THE PREFERRED EMBODIMENT

Figure 1:
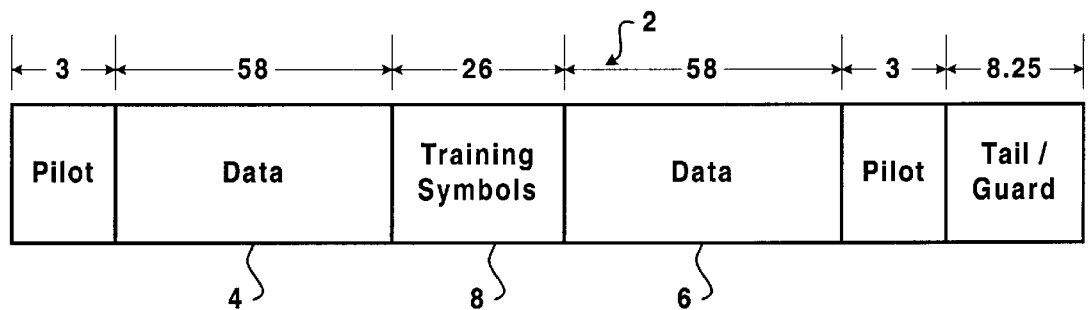
FIG. 1 is a schematic diagram of an exemplary modulated data slot for Enhanced Data rate for GSM Evolution (EDGE) analyzed using the methods and apparatus in accordance with the present invention.

As shown in FIG. 1, an exemplary EDGE-formatted MPSK slot 2 comprises leading and trailing data blocks 4 and 6 respectively separated by a training block 8. Each data block 4, 6 contains a respective set of N (e.g. N=58) MPSK symbols, which together comprise the data content of the MPSK slot 2. The training block 8 contains a predetermined set of $N_T$ (e.g. $N_T$=26) MPSK symbols. The composition and function of other portions of the MPSK slot 2 are not related to the present invention, and are not described herein.

Figure 2:
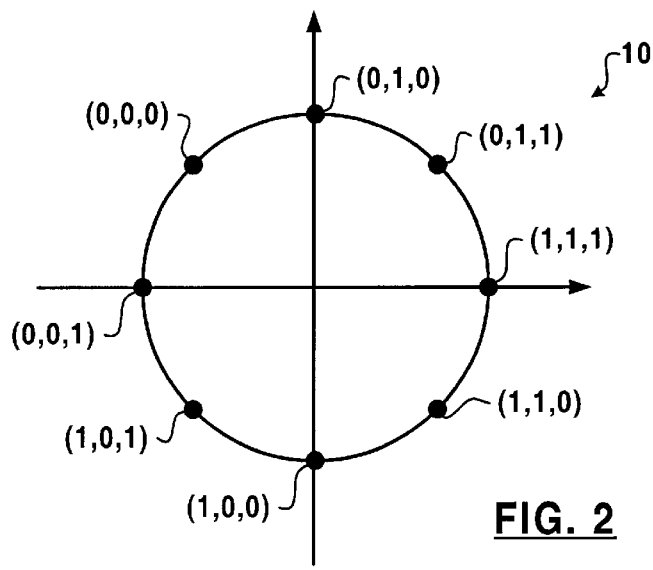
FIG. 2 is a schematic illustration of an exemplary MPSK constellation used to modulate the data slot shown in FIG. 1.

As shown in FIG. 2, the MPSK symbols contained in each of the data and training blocks 4–8 are selected from a constellation 10 of MPSK symbols. The number of PSK symbols forming a constellation 10 is related to the number of phases of the MPSK modulation system used. For example, the illustrated constellation is for 8-PSK modulation, and the constellation includes 8 symbols.

Figure 3:
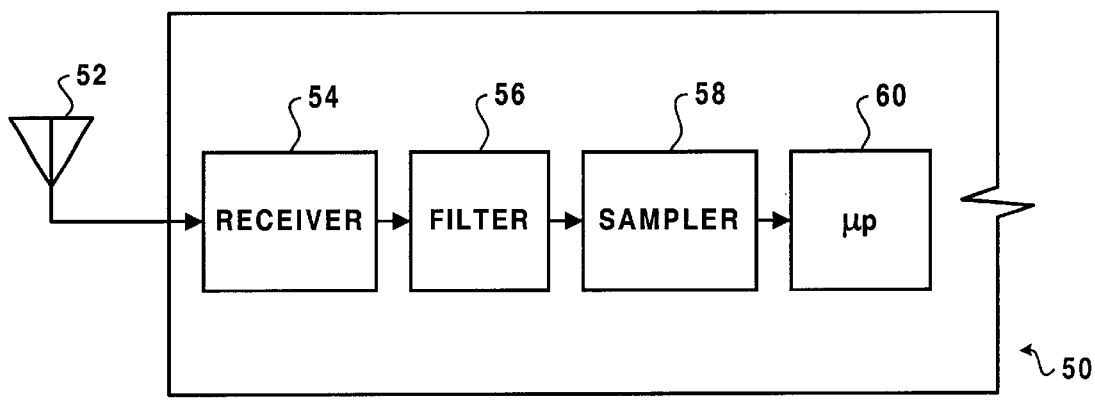
FIG. 3 is a schematic diagram of a portion of a radio receiver in accordance with the invention.

As mentioned above, when an MPSK modulated slot 2 is received by a radio receiver, it is typically corrupted by noise and ISI. Accordingly, as shown in FIG. 3, the invention provides a radio receiver 50 having an antenna 52, receiver circuitry 54, filter circuitry 56, a sampler and a processor 60. In accordance with the invention, the processor 60 simultaneously equalizes the received radio signal and detects the data symbols of the MPSK modulated slot 2 received by the receiver circuitry 54. The processor 60 of the invention simultaneously equalizes the received signal and detects data symbols by preparing an initial solution vector D including an estimated value $d[n]_0$ (where n is an index number of the symbol) for each data symbol; calculating a solution error $\epsilon_0$ of the solution vector D; and minimizing the solution error $\epsilon_0$ by perturbating the solution vector D.

Detection of data symbols is generally based on an estimate of the effects of ISI and noise on the received MPSK slot 2. The accuracy of this estimate is known to increase with an increasing length of a window used to analyze the received radio signal. However, the amount of computation (and thus cost) required to analyze the received radio signal also increases with the length of the window, so that a compromise between accuracy and cost becomes necessary. In the algorithm in accordance with the invention, signal analysis is based on an m-tap propagation model, so that the window has a length of mT (where T is a symbol sampling interval). This m-tap propagation model preferably accords with a recommended 6-tap Global System for Mobile (GSM) processor 60 profile, and provides at least one additional symbol interval to compensate for time-domain spread of the received radio signal caused by the receiver filter 56 circuitry of the radio receiver (FIG. 3). It has been established by experimentation that when used in accordance with the present invention, a 7-tap propagation model yields acceptable accuracy at reasonable computational cost. However, experimentation has also shown that the number of taps "m" used is a matter of design choice and is preferably related to the propagation model.

Figure 4A:
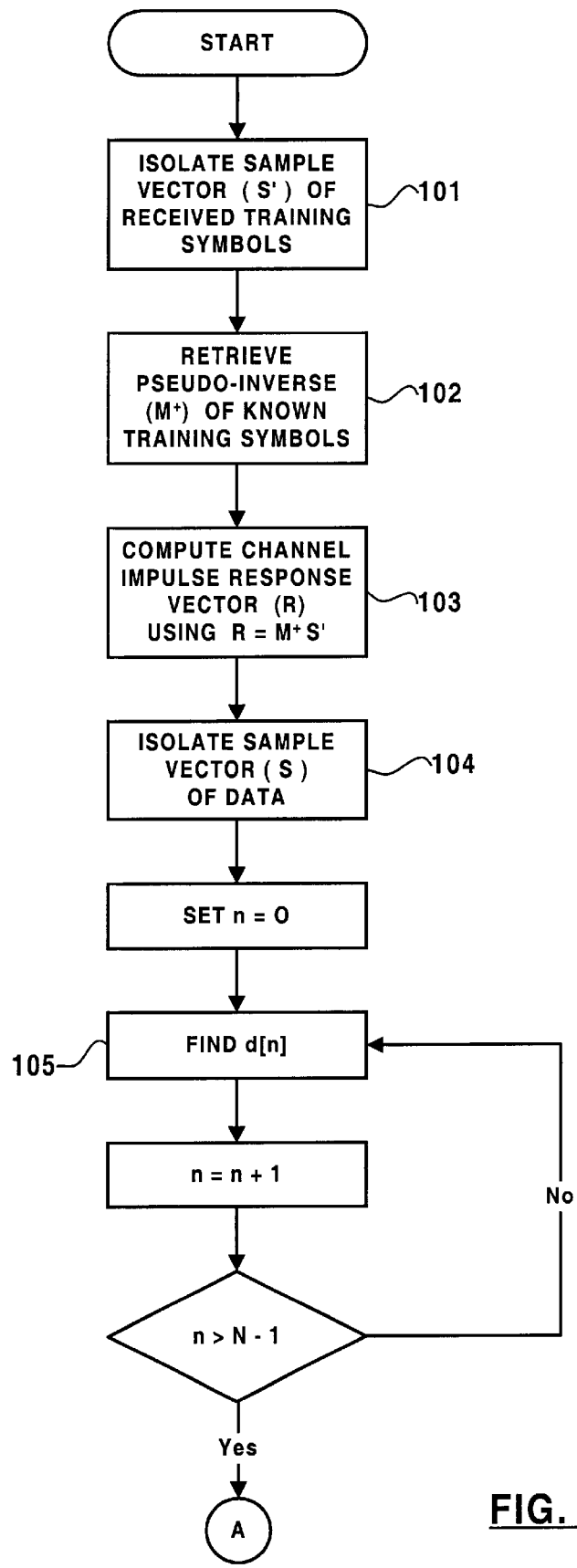
FIGS. 4a–c are a flow chart illustrating steps of an exemplary method of detecting data symbols in accordance with an embodiment of the present invention.
Figure 4B:
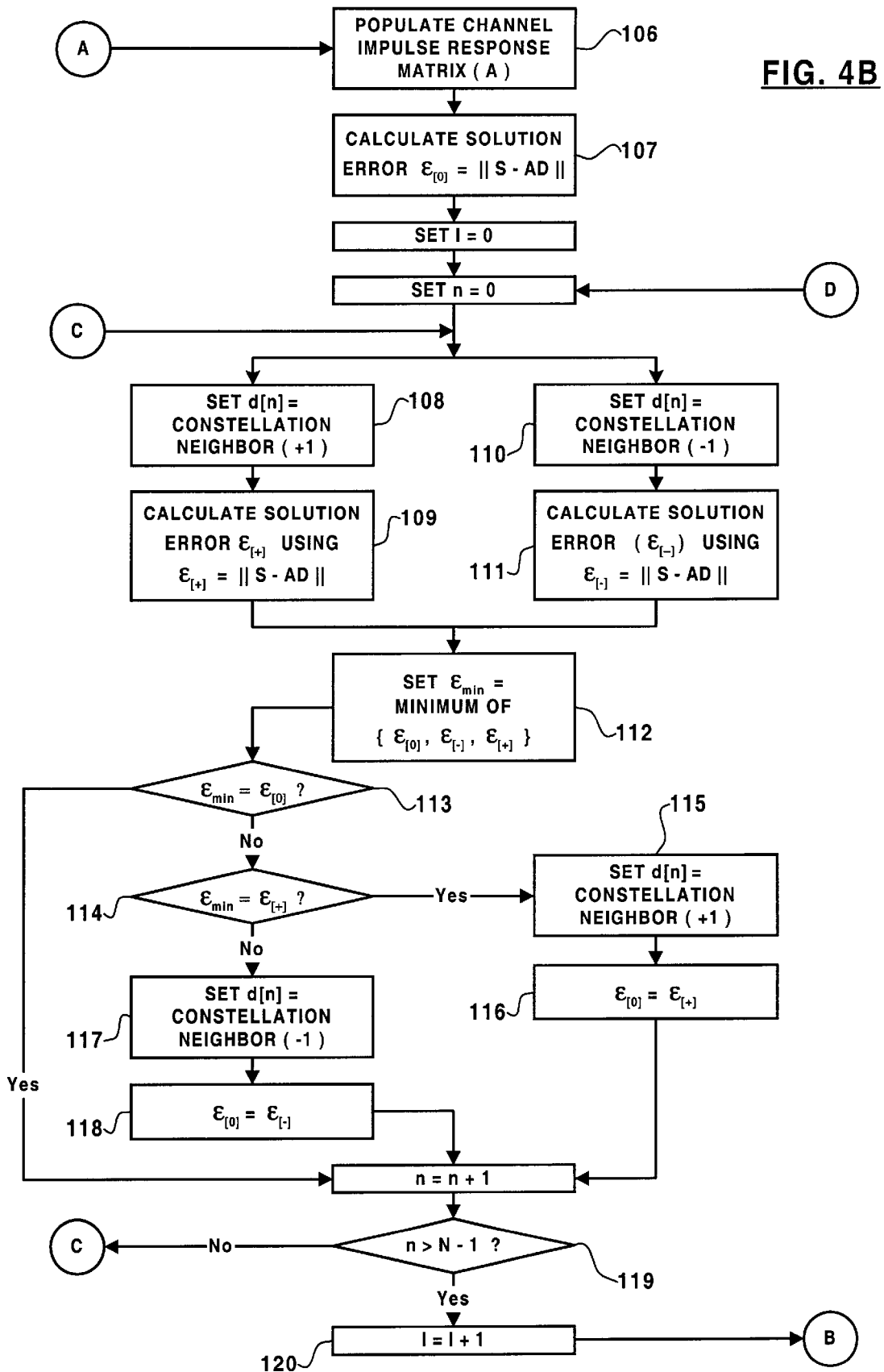

FIG. 4 illustrates the algorithm used for detecting data symbols in accordance with the invention in greater detail. As shown in FIG. 4, at step 101, the processor 60 isolates a sample vector S of the received training symbols s[n]. Use of the m-tap propagation model, as described above, implies that the first m−1 training symbols s[n] (i.e. for n=0→m−2) of the training block 8 will be corrupted by ISI from the last m−1 data symbols of the leading data block 4. Accordingly, the sample vector S preferably includes only the received training symbols s[n] (n=m−1→$N_T$).

After the sample vector S has been isolated, the processor 60 retrieves, at step 102, a pseudo-inverse symbol matrix $M^+$ of training symbols, which is previously constructed and stored in a memory associated with the microprocessor 60 during manufacture. The pseudo-inverse symbol matrix $M^+$ is constructed by pseudo-inversion of a training symbol matrix M which satisfies the equation:

$$S'=M*R'$$

where:
S' is a vector of the received symbols in the training block 8 of the MPSK slot; and R' is an assumed channel impulse response vector based on noise and ISI reception of the MPSK slot The symbol matrix M, vector S' and the assumed channel impulse response vector R' are based on the m-tap propagation model, and thus the first m−1 training symbols transmitted in the training block 8 of the MPSK slot are omitted. As a result, the received symbol vector S' does not include the first m−1 training symbols of an MPSK modulated slot 2 received by the radio receiver circuit 54.

Based on the sample vector S of received training symbols and the pseudo-inverse symbol matrix $M^+$, the processor 60 can compute, at step 103 a live channel impulse response vector R, which models the effects of noise and ISI on the received MPSK slot 2, in accordance with the equation:

$$R = M^{+*} S'$$

In keeping with the m-tap propagation model, the channel impulse response vector R includes m terms r[k] (k=0→m−1), one term for each tap of the propagation model. The channel impulse response vector R is assumed to be valid for the entire MPSK slot 2. In practice, this assumption yields acceptable results where the radio signal is not subject to excessive fade or time-domain spread, which is not expected to occur under normal conditions.

Once the channel impulse response vector R has been constructed, the processor 60 isolates, at step 104, a sample vector S of one of the data blocks 4, 6. This sample vector S will contain a number of terms corresponding to the number N of symbols transmitted in the data block 4, 6. Thus in the illustrated embodiment, the sample vector S will contain N=58 terms (s[n] where n=0→N−1). The processor 60 then calculates, at step 105, an initial solution vector D containing initial estimated values $d[n]_0$ (n=0→N−1) of the N symbols transmitted in the data block. In accordance with the present invention, each initial value $d[n]_0$ of the solution vector D is calculated by single-symbol detection, which comprises finding a value which most closely satisfies the equation:

$$s[n] = \sum_{k=0}^{m-1} d[n-k] \times r[k]$$

where:

d[n−k] is the estimated value of the (n−k)$^{th}$ symbol of the solution vector D;

s[n] is a value of a corresponding symbol of the sample vector S; and r[k] is a corresponding value of the channel impulse response vector R This calculation is repeated for each n=0→N−1.

Following preparation of the initial solution vector D as described above, the processor 60 proceeds with optimization of the solution vector D by perturbating the solution vector D and calculating a solution error ε after each perturbation.

At a preliminary step 106, the processor 60 first uses the channel impulse response vector R to populate a channel impulse response matrix A having a diagonal form as illustrated in FIG. 5. As is apparent, the channel impulse response matrix A shown in FIG. 5 is a low triangular matrix. This form is used for detection of data symbols of the trailing data block 6. For detection of the data symbols of the leading data block 4, the channel impulse response matrix A can be reformatted as a diagonal upper triangular matrix.

Otherwise, detection of data symbols of both data blocks 4, 6 follows an identical process.

The processor 60 then proceeds with calculation the solution error $\epsilon_0$ of the solution vector D at step 107. This calculation is based on the relationship between the sample matrix S, channel impulse response matrix A, and the solution vector D as shown in matrix form in FIG. 5. Symbolically, this relationship can be written in the form:

$$S = AD$$

The solution error $\epsilon_o$ of the solution vector D is the least squares value of a difference between S and AD, thus:

$$\epsilon_0 = \|S - AD\|$$

where:

$\epsilon_0$ is the calculated solution error;

S is the sample vector of the received slot 2;

A is the channel impulse response matrix; and

D is the solution vector.

Although the mathematical norm used for computing the solution error described above is the "least squares" norm, other norms can be used with success.

Once the solution error $\epsilon_o$ has been calculated (step 107), the processor 60 proceeds with minimization of the solution error by perturbation of the solution vector D. Perturbation of the solution vector D involves perturbating the estimated value d[n] of each symbol of the solution vector D, one symbol at a time. Perturbation of the estimated value d[n] of each symbol of the solution vector D proceeds as follows:

At step 108 the processor 60 substitutes the initial value $d[n]_0$ of the symbol with a first neighboring value $d[n]_{0+1}$ from the MPSK constellation (FIG. 2); and At step 109, the processor 60 calculates a respective first error $\epsilon_{0+1}$ of the solution vector D[+] including the first neighboring value $d[n]_{0+1}$ substituted for the initial value $d[n]_0$.

In a parallel process:

At step 110, the processor 60 substitutes the initial value $d[n]_0$ of the symbol with a second neighboring value from the MPSK constellation $d[n]_{0-1}$ (FIG. 2); and At step 111, the processor 60 calculates a respective second error $\epsilon_{0-1}$ of the solution vector D[−] including the second neighboring value $d[n]_{0-1}$ substituted for the initial value $d[n]_0$.

In step 112, the processor 60 sets $\epsilon_{min}$ equal to the minimum of the solution errors $\epsilon_0$, $\epsilon_{0-1}$ and $\epsilon_{0+1}$.

If at step 113 the processor 60 determines that $\epsilon_{min}$ equals $\epsilon_0$, the processor 60 determines whether all the values of the solution vector D have been perturbated (step 119), as explained below.

If at step 114 the processor 60 determines that $\epsilon_{min}$ equals $\epsilon_{0+1}$:

At step 115, the processor 60 adopts the first neighboring value $d[n]_{0+1}$ as a new value d[n] of the symbol; and At step 116, the processor 60 replaces the solution error $\epsilon_0$ with the solution error $\epsilon_{0+1}$ in preparation for perturbation of the next symbol.

If at step 114, $\epsilon_{min}$ is not equal to $\epsilon_{0+1}$, then:

At step 117, the processor 60 adopts the opposite neighboring value $d[n]_{0-1}$ as a new value d[n] of the symbol; and At step 118 the processor 60 replaces the solution error $\epsilon_0$ with solution error $\epsilon_{0-1}$ in preparation for perturbation of the next symbol.

Following perturbation of the value d[n] as described above (steps 107–118), the processor 60 determines (at step 119) whether all of the values of the solution vector D have been perturbated. If the result of this check is "NO", then the processor 60 repeats steps 107–118 for each successive symbol of the solution vector D until every symbol of the solution vector D has been perturbated. When the result of the check at step 119 is "YES" (indicating that all symbols of the solution vector D have been perturbated) an iteration index I is incremented at step 120 to indicate that a perturbation iteration has been completed.

Figure 4C:
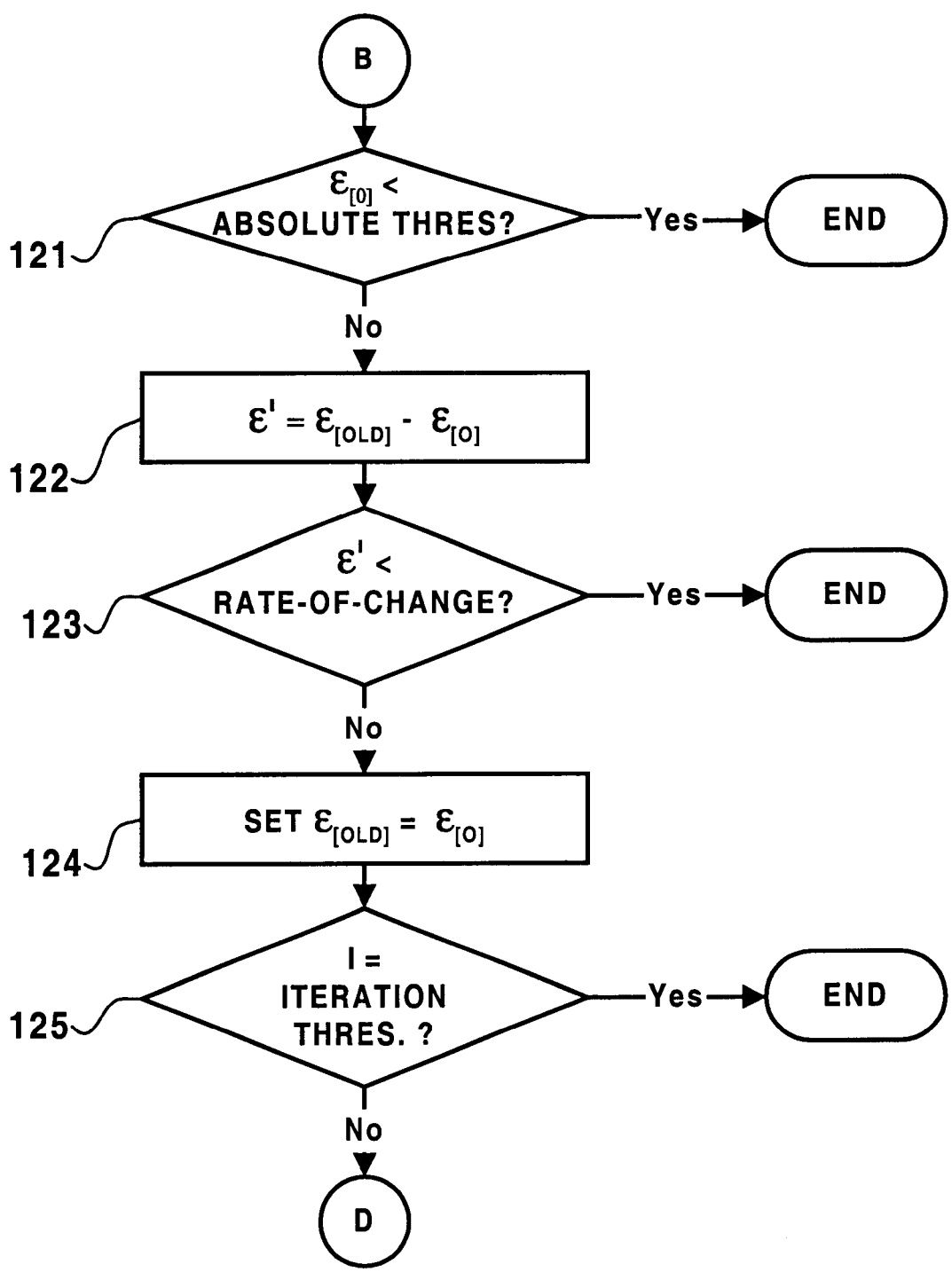

In the process of perturbating described above, the solution vector D (steps 108–120) is preferably perturbated recursively until a predetermined terminating condition is satisfied. As illustrated in FIG. 4c, the terminating conditions can be based on the value of the error, a change in the error between each perturbation iteration, and/or a number of iterations performed. Thus at step 121, the processor 60 determines whether the solution error $\epsilon_0$ is less than or equal to a predetermined threshold value (such as, for example, $10^{-8}$). If the result of the check at step 121 is "YES", then the detection algorithm terminates. Otherwise, at step 122 the processor 60 determines an error change $\epsilon'$ between the solution error $\epsilon_0$ and a previous solution error $\epsilon_{[old]}$ resulting from the previous perturbation iteration. At step 123, the processor 60 determines whether the solution error change $\epsilon'$ is less than a predetermined threshold. If the result of the check at step 121 is "YES", then the detection algorithm terminates. Otherwise, at step 124, the processor 60 updates the previous solution error $\epsilon_{[old]}$ with the current solution error $\epsilon_0$ in preparation for the next iteration. At step 125, the processor 60 determines whether the number of iterations completed equals a predetermined iteration threshold (such as, for example, 4 iterations). If the result of the check at step 125 is "YES", then the perturbation algorithm terminates. Otherwise, the processor 60 begins a new iteration of perturbating the solution vector D (at step 107).

When the perturbations of the solution vector D are complete, a near optimal solution for the identity of each MPSK symbol in a data block has been determined. Thus, the algorithm in accordance with the invention performs equalization and symbol detection simultaneously in a very computationally efficient process.

The embodiment of the invention described above is intended to be exemplary only. The scope of the invention is therefore intended to be limited solely by the scope of the appended claims.

We claim:

1. A method of performing equalization and detecting data symbols of an MPSK modulated slot received by a radio receiver, the method comprising:
   a) preparing an initial solution vector including an estimated value for each data symbol;
   b) calculating a solution error ($\epsilon_0$) for the solution vector; and
   c) minimizing the solution error by systematically perturbating data values of the solution vector.

2. A method as claimed in claim 1, wherein the step of preparing an initial solution vector comprises the steps of:
   a) constructing a channel impulse response vector; and
   b) estimating a value for each data symbol of the solution vector by single-symbol detection.

3. A method as claimed in claim 2, wherein the step of constructing a channel impulse response vector comprises a step of analyzing known training symbols in accordance with an equation:

$$R = M^{+} * S'$$

where:
   R is the channel impulse response vector;
   $M^+$ is a pseudo-inverse of a training symbol matrix of the known training symbols; and
   S' is a sample vector of received training symbols.

4. A method as claimed in claim 3, wherein the analysis of known training symbols is based on an m-tap propagation model, whereby the channel impulse response vector includes one term of each tap of a standard propagation model profile, and one term for compensating for a spatial filter of the radio receiver.

5. A method as claimed in claim 4, wherein m is greater than or equal to the number of taps in a propagation model selected as a signal received by the radio.

6. A method as claimed in claim 4, wherein the channel impulse response vector comprises m terms and the training symbol matrix comprises m columns.

7. A method as claimed in claim 4, wherein the analysis of known training symbols ignores the first m−1 training symbols received as part of the slot.

8. A method as claimed in claim 2, wherein single-symbol detection comprises finding, for each symbol of the solution vector, a value which most closely satisfies the equation:

$$s[n] = \sum_{k=0}^{m-1} d[n-k] \times r[k]$$

where:
   d[n−k] is the estimated value of the (n−k)$^{th}$ symbol of the solution vector;
   s[n] is a value of a corresponding symbol of a sample vector of the received slot; and
   r[k] is a corresponding value of the channel impulse response vector.

9. A method as claimed in claim 2, further comprising, following the step of preparing an initial solution vector, a step of populating a channel impulse response matrix with values of the channel impulse response vector.

10. A method as claimed in claim 9, wherein the step of calculating a solution error of the solution vector comprises determining:

$$\epsilon_0 = \|S - AD\|$$

where:
   $\epsilon_0$ is the calculated solution error;
   S is a sample vector of the received slot;
   A is the channel impulse response matrix; and
   D is the solution vector.

11. A method as claimed in claim 9, wherein the step of perturbating the solution vector comprises a step of successively perturbating the estimated value of each symbol of the solution vector.

12. A method as claimed in claim 11, wherein the step of perturbating the estimated value of each symbol of the solution vector comprises steps of:
   a) substituting an initial value $d[n]_0$ of the symbol with a first neighboring value from an MPSK constellation $d[n]_{0+1}$ and calculating a respective first error ($\epsilon_{0+1}$) for the solution vector which includes the first neighboring value in place of $d[n]_0$;
   b) substituting the initial value $d[n]_0$ of the symbol with an opposite neighboring value from the MPSK constellation d[n]$_{0-1}$ and calculating a respective second solution error $\epsilon_{0-1}$ for the solution vector which includes the second neighboring value in place d[n]$_o$;

c) determining which of the three solution errors, $\epsilon_0$, $\epsilon_{0+1}$ and $\epsilon_{0-1}$, has the smallest value, and:
   i) if $\epsilon_{0+1}$ has the smallest value, adopting the first neighboring value as a new value of the symbol; and
   ii) if $\epsilon_{0-1}$ has the smallest value, adopting the opposite neighboring value as a new value of the symbol.

13. A method as claimed in claim 12, wherein the step of calculating the solution error $\epsilon_{0+1}$ comprises determining:

$$\epsilon_{0+1} = \|S - AD_{0+1}\|$$

where:
$\epsilon_{0+1}$ is the solution error;
S is a sample vector of the received slot;
A is the channel impulse response matrix;
D$_{0+1}$ is the solution vector including the first neighboring value from the MPSK constellation
d[n]$_{0+1}$ as a substituted value of the nth symbol in the solution vector.

14. A method as claimed in claim 12, wherein the step of calculating the solution error $\epsilon_{0-1}$ comprises determining:

$$\epsilon_{0-1} = \|S - AD_{0-1}\|$$

where:
$\epsilon_{0-1}$ is second error;
S is a sample vector of the received slot;
A is the impulse response matrix; and
D$_{0-1}$ is the solution vector including the opposite neighboring value from the MPSK constellation d[n]$_{0-1}$ as the substituted value of the n symbol.

15. A method as claimed in claim 11, wherein the estimated value of only one symbol of the solution vector is perturbated during each successive perturbation step.

16. A method as claimed in claim 11, wherein the estimated value of symbols in the solution vector are perturbated in an order opposite to an order in which estimated values of the initial solution vector were computed.

17. A method as claimed in claim 1, wherein the steps of calculating a solution error and minimizing the solution error are repeated recursively until a predetermined terminating condition is satisfied.

18. A method as claimed in claim 17, wherein the predetermined terminating condition includes at least one of:
   a) the solution error is not greater than a predetermined threshold value;
   b) a change in the solution error between successive iterations is not greater than a predetermined threshold value; and
   c) a number of iterations completed equals a predetermined number of iterations.

19. An equalizer and symbol detector for detecting data symbols of an MPSK modulated slot received by a radio receiver, the equalizer and symbol detector comprising a processor adapted to:
   a) prepare an initial solution vector including an estimated value for each data symbol in the solution vector;
   b) calculate a solution error ($\epsilon_0$) for the solution vector; and
   c) minimize the solution error so by perturbating individual data values in the solution vector.

20. An equalizer and symbol detector as claimed in claim 19, wherein the processor is further adapted to estimate a value for each data symbol of the solution vector by finding, for each symbol of the solution vector, a value which most closely satisfies the equation:

$$s[n] = \sum_{k=0}^{m-1} d[n-k] \times r[k]$$

where:
d[n−k] is an estimated value of the (n−k)$^{th}$ symbol of the solution vector;
s[n] is a value of a corresponding symbol of a sample vector of the received slot; and
r[k] is a corresponding value of the channel impulse response vector.

21. An equalizer and symbol detector as claimed in claim 19, wherein the processor is adapted to calculate solution errors and minimize the solution error $\epsilon_0$ recursively until a predetermined terminating condition is satisfied.

22. An equalizer and symbol detector as claimed in claim 21, wherein the predetermined terminating condition includes at least one of:
   a) the solution error is less than a predetermined threshold value;
   b) a change in the solution error between successive iterations is less than a predetermined threshold value; and
   c) a number of iterations completed equals a predetermined maximum number.

23. An equalizer and data symbol detector as claimed in claim 19, wherein the processor is adapted to perturbate the solution vector by successively perturbating the estimated value of each symbol of the solution vector.

24. An equalizer and data symbol detector as claimed in claim 23, wherein the processor is adapted to perturbate the estimated value of each symbol of the solution vector by:
   a) substituting an initial value d[n]$_0$ of the symbol with a first neighboring value from an MPSK constellation d[n]$_{0+1}$ and calculating a respective first error ($\epsilon_{0+1}$) for the solution vector which includes the first neighboring value in place of d[n]$_0$;
   b) substituting the initial value d[n]$_0$ of the symbol with an opposite neighboring value from the MPSK constellation d[n]$_{0-1}$ and calculating a respective second solution error E$_{0-1}$ for the solution vector which includes the second neighboring value in place d[n]$_0$;
   c) determining which of the three solution errors, $\epsilon_0$, $\epsilon_{0+1}$ and $\epsilon_{0-1}$, has the smallest value, and:
      i) if $\epsilon_{0+1}$ has the smallest value, adopting the first neighboring value as a new value of the symbol; and
      ii) if $\epsilon_{0-1}$ has the smallest value, adopting the opposite neighboring value as a new value of the symbol.

25. An equalizer and data symbol detector as claimed in claim 23, wherein the processor is further adapted to perturbate the estimated value of only one symbol of the solution vector during each successive perturbation step.

26. An equalizer and data symbol detector as claimed in claim 23, wherein the processor is further adapted to perturbate the estimated value of each symbol of the solution vector in an order opposite to an order of computing estimated values of the initial solution vector.

27. A radio communications device adapted for radio communication of data symbols of a multiple-phase-shift-keying (MPSK) modulated slot, the radio communications device comprising:

a) a receiver adapted to receive a radio signal carrying the MPSK modulated slot;
b) a sampler adapted to sample the received radio signal to generate a sample vector of the received slot; and
c) a processor adapted to:
  i) prepare an initial solution vector including an estimated value for each data symbol;
  ii) calculate a solution error ($\epsilon_0$) for the solution vector; and
  iii) minimize the solution error by perturbating the solution vector.

28. A radio communications device as claimed in claim 27, wherein the processor is further adapted to estimate a value for each data symbol of the solution vector by finding, for each symbol of the solution matrix, a value which most closely satisfies the equation:

$$s[n] = \sum_{k=0}^{m-1} d[n-k] \times r[k]$$

where:
  d[n−k] is an estimated value of the (n−k)$^{th}$ symbol of the solution vector;
  s[n] is a value of a corresponding symbol of a sample vector of the received slot; and
  r[k] is a corresponding value of the channel impulse response vector.

29. A radio communications device as claimed in claim 27, wherein the processor is adapted to calculate a solution error and minimize the solution error recursively until a predetermined terminating condition is satisfied.

30. A radio communications device as claimed in claim 29, wherein the predetermined terminating condition includes at least one of:
  a) the solution error is less than a predetermined threshold value;
  b) a change in the solution error between successive iterations is less than a predetermined threshold value; and
  c) a number of iterations completed equals a predetermined maximum number.

31. A radio communications device as claimed in claim 27, wherein the processor is adapted to perturbate the solution vector by successively perturbating the estimated value of each symbol of the solution vector.

32. A radio communications device as claimed in claim 31, wherein the processor is adapted to perturbate the estimated value of each symbol of the solution vector by:
  a) substituting an initial value d[n]$_0$ of the symbol with a first neighboring value from an MPSK constellation d[n]$_{0+1}$ and calculating a respective first error ($\epsilon_{0+1}$) for the solution vector which includes the first neighboring value in place of d[n]$_0$;
  b) substituting the initial value d[n]$_0$ of the symbol with an opposite neighboring value from the PSK constellation d[n]$_{0-1}$ and calculating a respective second solution error $\epsilon_{0-1}$ for the solution vector which includes the second neighboring value in place d[n]$_0$;
  c) determining which of the three solution errors, $\epsilon_0$, $\epsilon_{0+1}$ and $\epsilon_{0-1}$, has the smallest value, and:
    i) if $\epsilon_{0+1}$ has the smallest value, adopting the first neighboring value as a new value of the symbol; and
    ii) if $\epsilon_{0-1}$ has the smallest value, adopting the opposite neighboring value as a new value of the symbol.

33. A radio communications device as claimed in claim 31, wherein the processor is further adapted to perturbate the estimated value of only one symbol of the solution vector during each successive perturbation step.

34. A radio communications device as claimed in claim 31, wherein the processor is further adapted to perturbate the estimated value of each symbol of the solution vector in an order opposite to an order of estimation of values of the initial solution vector.

* * * * *